United States Patent [19]

Oka et al.

[11] Patent Number: 4,553,734

[45] Date of Patent: Nov. 19, 1985

[54] FINGER PRESSURE ACTUABLE DUMP CONTROL SYSTEM FOR DUMP VEHICLES

[75] Inventors: Koichi Oka; Fumio Shintani, both of Kawasaki, Japan

[73] Assignee: Kabushiki Kaisha Komatsu Seisakusho, Tokyo, Japan

[21] Appl. No.: 566,251

[22] Filed: Dec. 28, 1983

[51] Int. Cl.⁴ .................. F15B 13/044; F01B 1/00
[52] U.S. Cl. .................. 251/58; 251/129.04; 91/1; 91/186; 91/459; 91/521
[58] Field of Search .................. 251/131, 58; 91/469, 91/521, 522, 459, 186, 1

[56] References Cited

U.S. PATENT DOCUMENTS

| | | | |
|---|---|---|---|
| 2,221,365 | 11/1940 | Wore | 251/131 |
| 2,347,523 | 4/1944 | Suksdorf | 251/131 |
| 3,125,000 | 3/1964 | Reuter | 91/186 |
| 3,179,274 | 4/1965 | Comfort | 91/459 |
| 4,072,087 | 2/1978 | Mueller | 91/459 |

*Primary Examiner*—Paul E. Maslousky
*Attorney, Agent, or Firm*—Armstrong, Nikaido, Marmelstein & Kubovcik

[57] ABSTRACT

A pushbutton control system for raising and lowering the dump body of a dump vehicle. Included are "up", "hold" and "down/float" switches which are connected in circuit with "up", "down" and "float" solenoid valves. These valves on energization direct pressurized air into the "up", "down" and "float" chambers of two air cylinders included in an actuating mechanism for a hoist valve controlling the telescopic hoist cylinders of the vehicle. The dump body is raised upon depression of the "up" switch with the consequent opening of the "up" valve. The depression of the "down/float" switch, resulting in the opening of the "down" valve, causes the dump body to lower by the forced contraction of the hoist cylinders. Upon subsequent release of the "down/float" switch the "float" valve opens to allow the dump body to lower under its own weight. The depression of the "hold" switch, with the consequent closure of all the solenoid valves, makes it possible to hold the dump body against movement in any desired position. Pilot lamps are provided to indicate the operating conditions of the control system in response to the actuation of the switches.

3 Claims, 12 Drawing Figures

FIG. 8
RAISING THE DUMP BODY

FIG. 9

DUMP BODY IN TOPMOST POSITION

FIG. 10
LOWERING THE DUMP BODY

FIG. 11

LOWERING THE DUMP BODY BY GRAVITY

FINGER PRESSURE ACTUABLE DUMP CONTROL SYSTEM FOR DUMP VEHICLES

BACKGROUND OF THE INVENTION

This invention relates to a control system for the dump body of a dump vehicle and pertains more specifically to a novel electropneumatic dump control system which affords the finger pressure actuation of the dump body.

A great variety of dump vehicles have been used extensively, both on and off highways, as versatile and efficient hauling units for loose materials. The dump vehicle operator has heretofore encountered difficulties, however, in controlling the up and down motion of the dump body with respect to the vehicle chassis. The typical conventional dump control system has been purely pneumatic, including a control lever disposed on one side of the operator's seat in the cab for the actuation of a hoist cylinder control valve. The operator has had to exert considerable force for manipulating the control lever.

Further, installed close to the operator's seat, the control lever and valve arrangement have occupied a large proportion of the narrowly confined space within the cab. It may be contemplated to mount the control valve exteriorly of the cab. This solution is unsatisfactory, however, as it requires an additional linkage between the lever and valve.

The prior art pneumatic dump control system has also made it difficult to provide electrical alarm means such as pilot lamps indicative of the various working conditions of the dump body. The provision of such alarm means is essential as the operation of the dump vehicle demands utmost caution to minimize any hazard to the workers.

SUMMARY OF THE INVENTION

The present invention provides a novel dump control system of mostly electrical (more specifically, electropneumatic) construction which is capable of finger pressure actuation, as by the depression of pushbutton switches, thus freeing the operator from the physical labor heretofore required for operating the dump body. By thus providing the electrified dump control system, the invention also solves the problem of how to minimize the space it occupies within the cab. Still further the invention makes possible the easy provision of electrical alarm means for operating safety.

The dump control system in accordance with the invention comprises a hoist valve actuating mechanism having fluid actuated cylinder means, and valve means for the selective delivery of fluid under pressure to the cylinder means. The valve means are operated electrically by manual activation of switches.

The switches are preferably of the pushbutton type, comprising an "up" switch for raising the dump body, a "down/float" switch for lowering it, and a "hold" switch for holding it stationary in any desired position. The selective depression of these switches results in the selective energization, or deenergization, of solenoid valves which control the delivery of pressurized air to the air cylinders of the hoist valve actuating mechanism. The operator may simply activate the pushbutton switches by light finger pressure, instead of manipulating the heavy control lever as has been the case heretofore, for controlling the dump body.

Perhaps as an incidental feature of the invention the dump control system further comprises "up", "down", "float" and "hold" pilot lamps to clearly indicate the operating conditions of the vehicle. These pilot lamps glow in response to the actuation of the switches.

The above and other features and advantages of this invention and the manner of realizing them will become more apparent, and the invention itself will best be understood, from a study of the following description and appended claims, with reference had to the attached drawings showing a preferred embodiment of the invention.

DESCRIPTION OF THE PREFERRED EMBODIMENT

Figure 1:
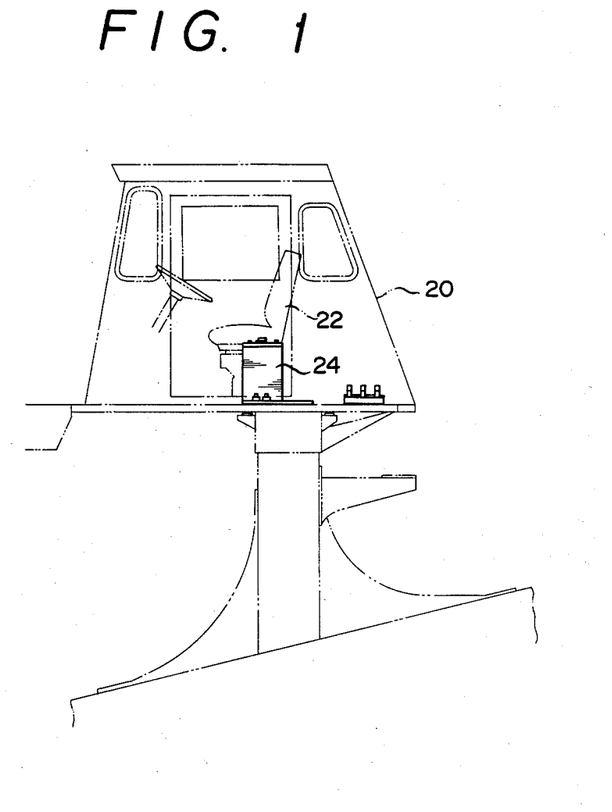
FIG. 1 is a diagrammatic side elevation of the cab and neighboring parts of the dump vehicle incorporating the dump control system in accordance with the invention.
Figure 2:
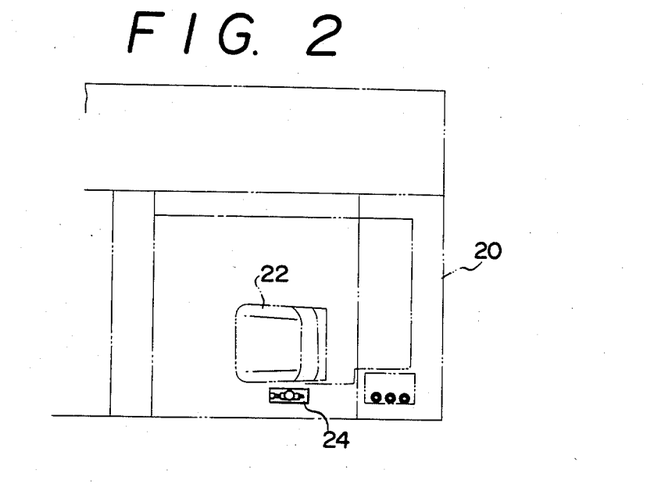
FIG. 2 is a diagrammatic top plan explanatory of the arrangement of the operator's seat, dump control console, etc., within the cab of FIG. 1, the dump control console having pushbutton switches included in the dump control system in accordance with the invention.
Figure 3:
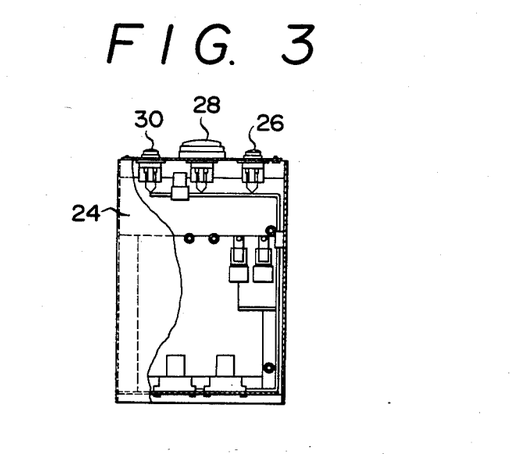
FIG. 3 is an enlarged side elevation, partly shown broken away to reveal the inner details, of the dump control console of FIG. 2.
Figure 4:
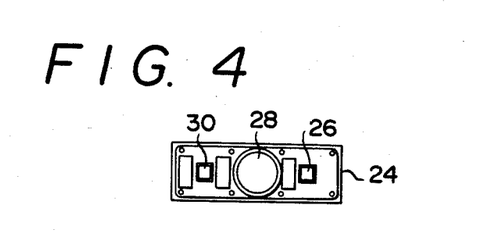
FIG. 4 is a top plan of the dump control console of FIG. 3.
Figure 5:
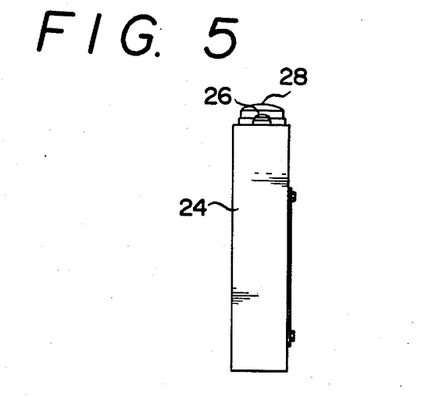
FIG. 5 is a rear elevation of the dump control console.

The reference numeral 20 in FIGS. 1 and 2 indicates the cab of a standard dump truck. The cab 20 defines an operator compartment having a seat 22. Disposed on one side of the operator's seat 22 and within easy reach of the operator sitting thereon is a control console 24 for controlling the up and down motion of the dump body, not shown, of the vehicle in accordance with the novel concepts of the present invention. As illustrated on an enlarged scale in FIGS. 3, 4 and 5, the control console 24 has three pushbutton switches arranged in a row on its top for activation by the vehicle operator. These switches are:

1. An "up" switch 26 for raising the dump body.
2. A "hold" switch 28 for holding the dump body stationary in any desired angular position with respect to the vehicle chassis.
3. A "down/float" switch 30 for lowering the dump body.

Figure 6:
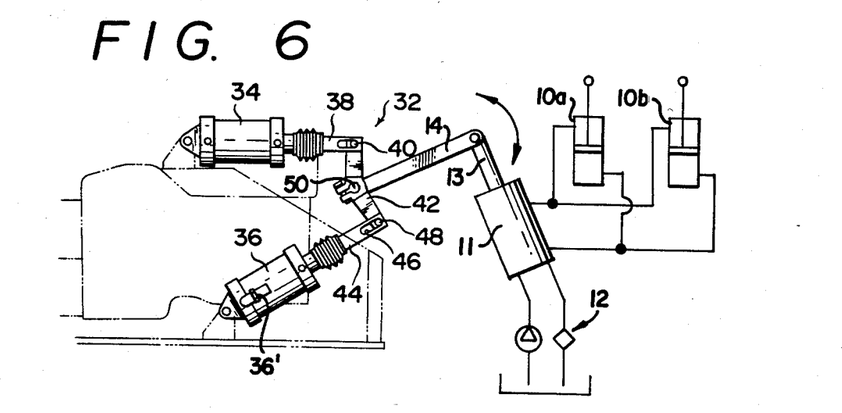
FIG. 6 is an elevation of the hoist valve actuating mechanism forming a part of the dump control system in accordance with the invention.

In FIG. 6 is shown a hoist valve actuating mechanism 32, constituting a part of the dump control system in accordance with the invention, for actuating the hoist valve 11 controlling the hoist cylinders 10a, 10b for the dump body. Both hoist valve and hoist cylinders fall outside the purview of the instant invention. Suffice it to say that the hoist cylinders for use with the representative dump control system disclosed herein are telescopic. The telescopic hoist cylinders are contracted, for lowering the dump body, first by the forced circulation of the hydraulic fluid and then under the weight of the dump body. The word "float" used herein, as in the "down/float" switch 30, indicates a condition allowing such lowering of the dump body by gravity. The initial contraction of the hoist cylinders by the forced circulation of the fluid is necessary because the vehicle may stand inclined when the dump body is in its topmost position; the body may not turn in the proper direction without the forced contraction of the hoist cylinders.

The hoist valve actuating mechanism 32 of FIG. 6 comprises first 34 and second 36 fluid actuated, preferably pneumatic, cylinders. The first cylinder 34 has a piston rod 38 pin jointed at 40 to one end of a lever 42. The second cylinder 36 has a drain port 36' and a piston rod 44 slotted at 46 to slidably receive a pin 48 on the other end of the lever 42. This lever has a rod or pin 50 midway between its opposite ends for the actuation of the hoist valve 11. The pair of hoist cylinders 10a, 10b are hydraulically connected through the hoist valve 11 with a hydraulic fluid supply source 12. The hoist valve 11 includes a valve spool 13 pivotally connected to one end of a lever 144. The other end of the lever is fixedly connected to the pin 50. The hoist cylinders 10a and 10b, the hoist valve 11 including valve spool 13 and lever 14, and the hydraulic fluid supply source 12 are conventional. The dump control system in accordance with the invention effects selective delivery of pressurized air into the air chambers of the cylinders 34 and 36 in response to the three pushbutton switches 26, 28 and 30 for controlling the hoist cylinders, and therefore the dump body, via the hoist valve.

Figure 7:
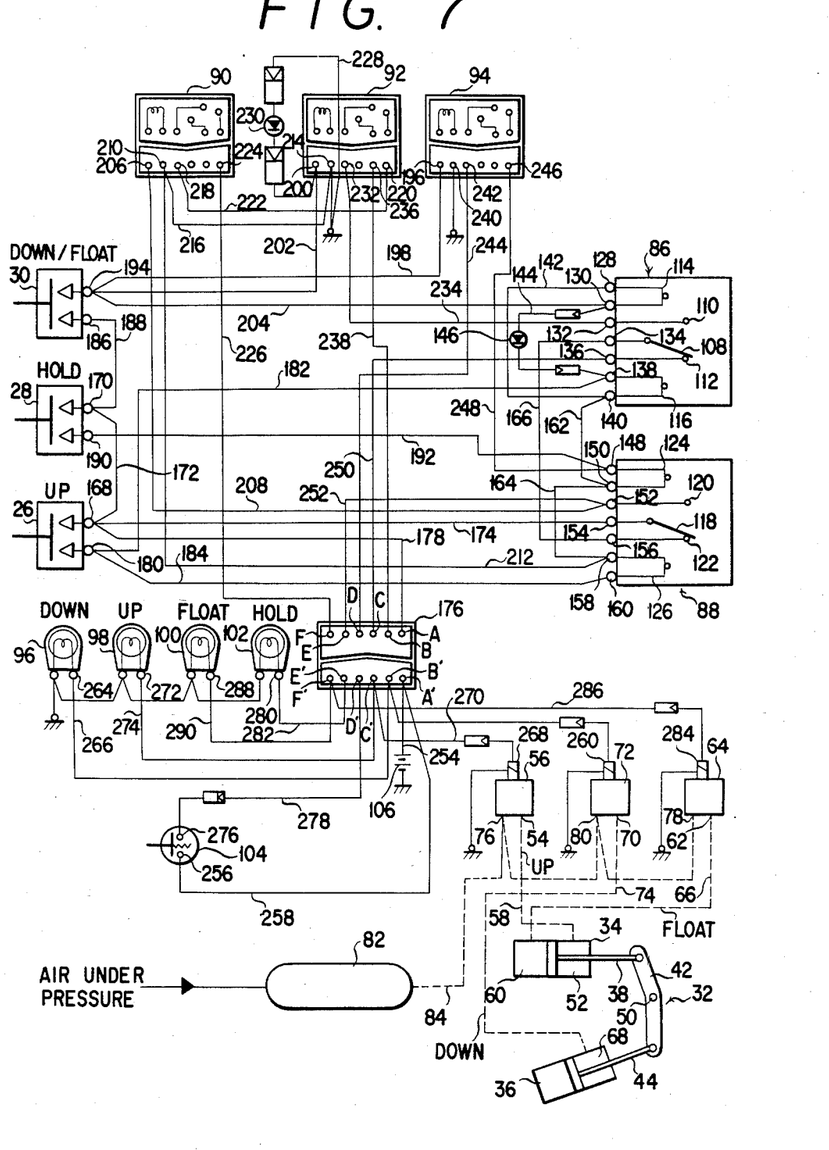
FIG. 7 is a schematic diagram showing the complete electropneumatic dump control system embodying the principles of this invention.

FIG. 7 is a diagrammatic representation of the complete dump control system, including the three pushbutton switches 26, 28 and 30 on the top of the control console by the side of the operator's seat and the hoist valve actuating mechanism 32. The first cylinder 34 has a rod end or "up" chamber 52 communicating with the outlet port 54 of an "up" solenoid valve 56 by way of a conduit 58, and a head end or "float" chamber 60 communicating with the outlet port 62 of a "float" solenoid valve 64 by way of a conduit 66. The second cylinder 36 has a rod end or "down" chamber 68 communicating with the outlet port 70 of a "down" solenoid valve 72 by way of a conduit 74. The listed three solenoid valves 56, 64 and 72 have respective drain ports (not shown) and their inlet ports 76, 78 and 80 in constant communication with a source of compressed air herein shown as an air reservoir 82 by way of a conduit 84. The inlet ports 76, 78 and 80 are normally closed when valves 56, 64 and 72 are de-energized.

Thus the energization of the "up" solenoid valve 56 results in the raising of the dump body. The energization of the "down" solenoid valve 72 results in the lowering of the dump body by the forced contraction of the telescopic hoist cylinders. The energization of the "float" solenoid valve 64 results in the lowering of the dump body by gravity. All the solenoid valves 56, 64 and 72 are deenergized for holding the dump body against motion in a desired angular position and, at that time, compressed air from reservoir 82 is discharged through the drain ports of valves 56, 64 and 72. Thus, the hoist cylinders are operated by the actual movements of cylinders 34 and 36.

The illustrated dump control system further comprises the following major components:

1. First to fifth relays 86, 88, 90, 92 and 94 to cause selective energization, and deenergization, of the solenoid valves 56, 64 and 72 in response to the pushbutton switches 26, 28 and 30.
2. Four pilot lamps 96, 98, 100 and 102 which are to glow to indicate the "down", "up", "float" and "hold" conditions, respectively, of the dump body.
3. A body switch 104 to be closed automatically when the dump body reaches the topmost position.
4. An electric power supply 106 for energizing the solenoid valves 56, 64 and 72.

The first relay 86 has a movable contact 108, two fixed contacts 110 and 112, a set circuit 114, and a reset circuit 116. The movable contact 108 engages the fixed contact 110 on energization of the set circuit 114 and engages the other fixed contact 112 on energization of the reset circuit 116. The second relay 88 is of like configuration, comprising a movable contact 118, two fixed contacts 120 and 122, a set circuit 124, and a reset circuit 126. The movable contact 118 engages the fixed contact 120 on energization of the set circuit 124 and engages the other fixed contact 122 on energization of the reset circuit 126.

The first relay 86 has first 128 and second 130 terminals connected to the set circuit 114, a third terminal 132 connected to the fixed contact 110, a fourth terminal 134 connected to the movable contact 108, a fifth terminal 136 connected to the fixed contact 112, and a sixth 138 and seventh 140 terminals connected to the reset circuit 116. The first terminal 128 is further connected directly to the seventh terminal 140 via line 142. The second terminal 130 is further connected to the sixth terminal 130 via line 144 having a diode 146.

The second relay 88 has first 148 and second 150 terminals connected to the set circuit 124, a third terminal 152 connected to the fixed contact 120, a fourth terminal 154 connected to the movable contact 118, a fifth terminal 156 connected to the fixed contact 122, and sixth 158 and seventh 160 terminals connected to the reset circuit 126. The second terminal 150 of the second relay 88 is connected to the seventh terminal 140 of the first relay 86 via line 162 and further to the sixth terminal 158 of the second relay via line 164. The fifth terminal 156 of the second relay 88 is connected to the fourth terminal 134 of the first relay 86 via line 166.

The "up" switch 26 has a first fixed contact 168 connected to a first fixed contact 170 of the "hold" switch 28 via line 172, to the fourth terminal 154 of the second relay 88 via line 174, and to a terminal A of a connector 176 via line 178. The second fixed contact 180 of the "up" switch 26 is connected to the sixth terminal 138 of the first relay 86 via line 182 and to the seventh terminal 160 of the second relay 88 via line 184.

The first fixed contact 170 of the "hold" switch 28 is connected to a fixed contact 186 of the "down/float" switch 30 via line 188, besides being connected to the first fixed contact 168 of the "up" switch 26. A second fixed contact 190 of the "hold" switch 28 is connected to the first terminal 148 of the second relay 88 via line 192.

The "down/float" switch 30 has another fixed contact 194 connected to a terminal 196 of the fifth relay 94 via line 198, to a terminal 200 of the fourth relay 92 via line 202, and to the second terminal 130 of the first relay 86 via line 204.

The third relay 90 has a terminal 206 connected to the third terminal 152 of the second relay 88 via line 202, a terminal 210 connected to the sixth terminal 158 of the second relay 88 via line 212 and to a terminal 214 of the fourth relay 92 via line 216, a terminal 218 connected to a terminal 220 of the fourth relay 92 via line 222, and a terminal 224 connected to a terminal F of the connector 176 via line 226.

The terminal 200 of the fourth relay 92 is grounded via line 228 having a diode 230, besides being connected to the fixed terminal 194 of the "down/float" switch 30 via the line 202. The terminal 214 of the fourth relay 92 is also grounded, besides being connected to the terminal 210 of the third relay 90 via the line 216. Further the fourth relay 92 has a terminal 232 connected to the terminal 132 of the first relay 86 via line 234, and a terminal 236 connected to the terminal B of the connector 176 via line 238.

In addition to the terminal 196 connected to the fixed contact 194 of the "down/float" switch 30, the fifth relay 94 has a terminal 240 grounded, a terminal 242 connected to the terminal D of the connector 176 via line 244, and a terminal 246 connected to the terminal 148 of the second relay 88 via line 248.

The terminal 136 of the first relay 86 is connected to the terminal C of the connector 176 via line 250. The terminal 152 of the second relay 88 is connected to the terminal E of the connector 176 via line 252.

The connector 176 has the aforementioned set of terminals A, B, C, D, E and F and serves to electrically connect these terminals to another set of terminals A′, B′, C′, D′, E′ and F′, respectively. The terminal A′ is connected to the power supply 106 via line 254 and also to a fixed contact 256 of the aforesaid body switch 104 via line 258. The terminal B′ is connected to the solenoid 260 of the "down" valve 72 via line 262 and to the terminal 264 of the "down" pilot lamp 96 via line 266. The terminal C′ is connected to the solenoid 268 of the "up" valve 56 via line 270 and to the terminal 272 of the "up" pilot lamp 98 via line 274. The terminal D′ is connected to a fixed contact 276 of the body switch 104 via line 278. The terminal E′ is connected to the terminal 280 of the "hold" pilot lamp 102 via line 282. The terminal F′ is connected to the solenoid 284 of the "float" valve 64 via line 286 and to the terminal 288 of the "float" pilot lamp 100 via line 290.

OPERATION

FIGS. 8 through 12 are explanatory of the operation of the dump control system of FIG. 7, depicting its conditions in the various aspects of dump body control. The following lines are used in all these figures to clearly indicate the electrical functions of the various connecting lines of the dump control system:

1. Dot and dash lines: Supply circuits from the power supply 106.
2. Dash lines: Grounding circuits.
3. Dotted lines: Relay energizing circuits.
4. Thick lines: Supply circuits to the solenoid valves 56, 64 and 72 and to the pilot lamps 96, 98, 100 and 102.

The "up" switch 26, "hold" switch 28, "down/float" switch 30, and body switch 104 are all normally open as in FIG. 7.

Raising the Dump Body

Figure 8:
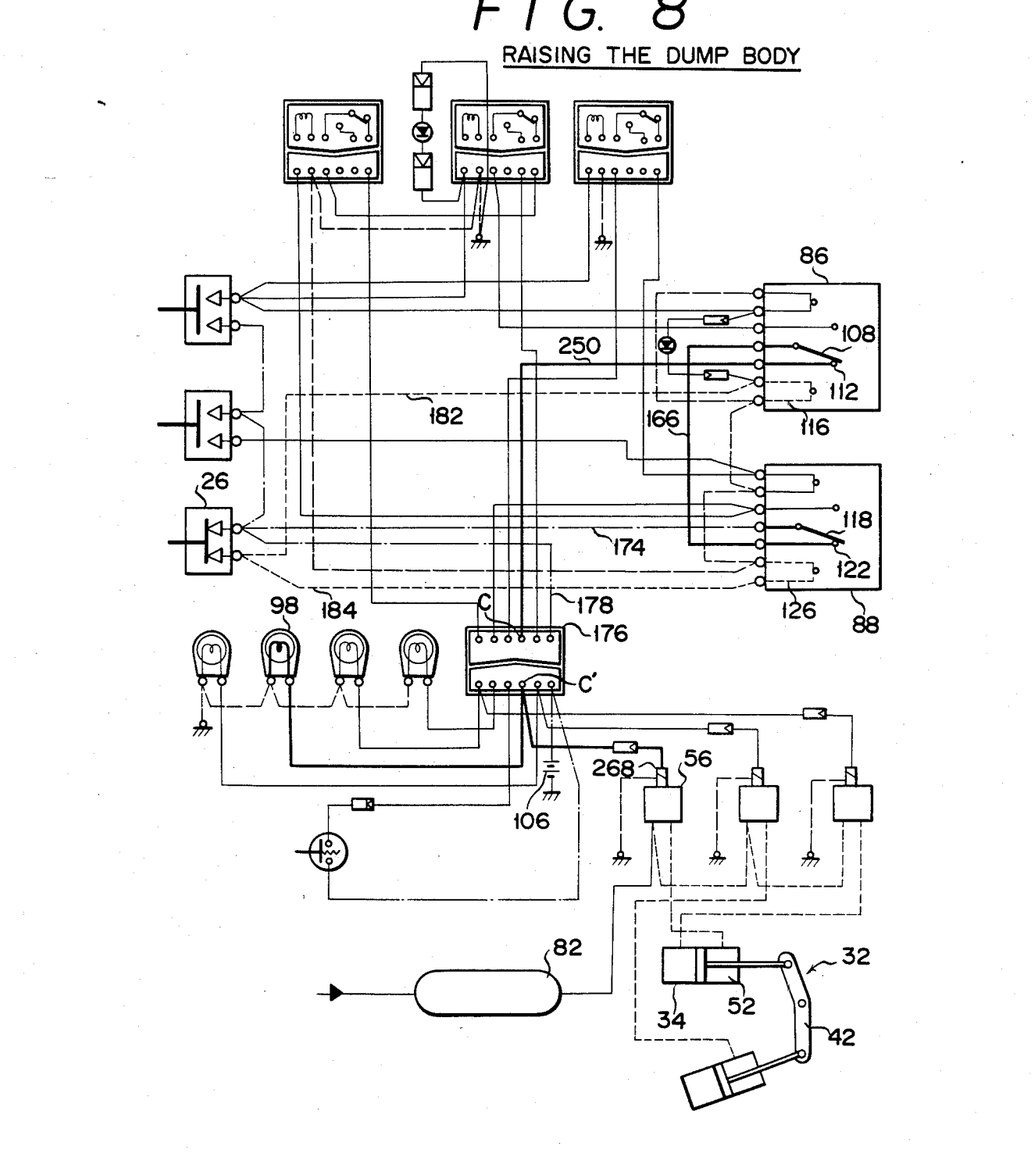
FIG. 8 is a diagram similar to FIG. 7 but explanatory of the operation of the dump control system when the dump body is being raised.

The operator may depress the "up" switch 26, as in FIG. 8, for raising the unshown dump body. The closed "up" switch 26 connects the dot and dash line 178 from the power supply 106 both to the dotted line 182 leading to the reset circuit 116 of the first relay 86 and to the dotted line 184 leading to the reset circuit 126 of the second relay 88. Thus energized, the reset circuits 116 and 126 cause the movable contacts 108 and 118 to engage the fixed contacts 112 and 122, respectively. It will be seen that the supply line 178 is coupled directly to the dot and dash line 174 leading to the movable contact 118 of the second relay 88. The relays 86 and 88 connect this line 174 to the terminal C of the connector 176 via the thick lines 166 and 250. The corresponding terminal C′ of the connector is coupled to the solenoid 268 of the "up" valve 56 and to the "up" pilot lamp 98.

On energization the "up" solenoid valve 56 directs the compressed air from the receiver 82 to the "up" chamber 52 of the first cylinder 34 of the hoist valve actuating mechanism 32. The lever 42 of this actuating mechanism actuates the hoist control valve to cause extension of the unshown hoist cylinders. Thus the dump body starts rising. The "up" pilot lamp 98 glows to indicate such rising of the dump body.

The operator may immediately release the "up" switch 26. Since the movable contacts 108 and 118 of the first 86 and second 88 relays remain engaged with the fixed contacts 112 and 122, the "up" solenoid valve 56 remains energized to cause the continued upward motion of the dump body.

Figure 9:
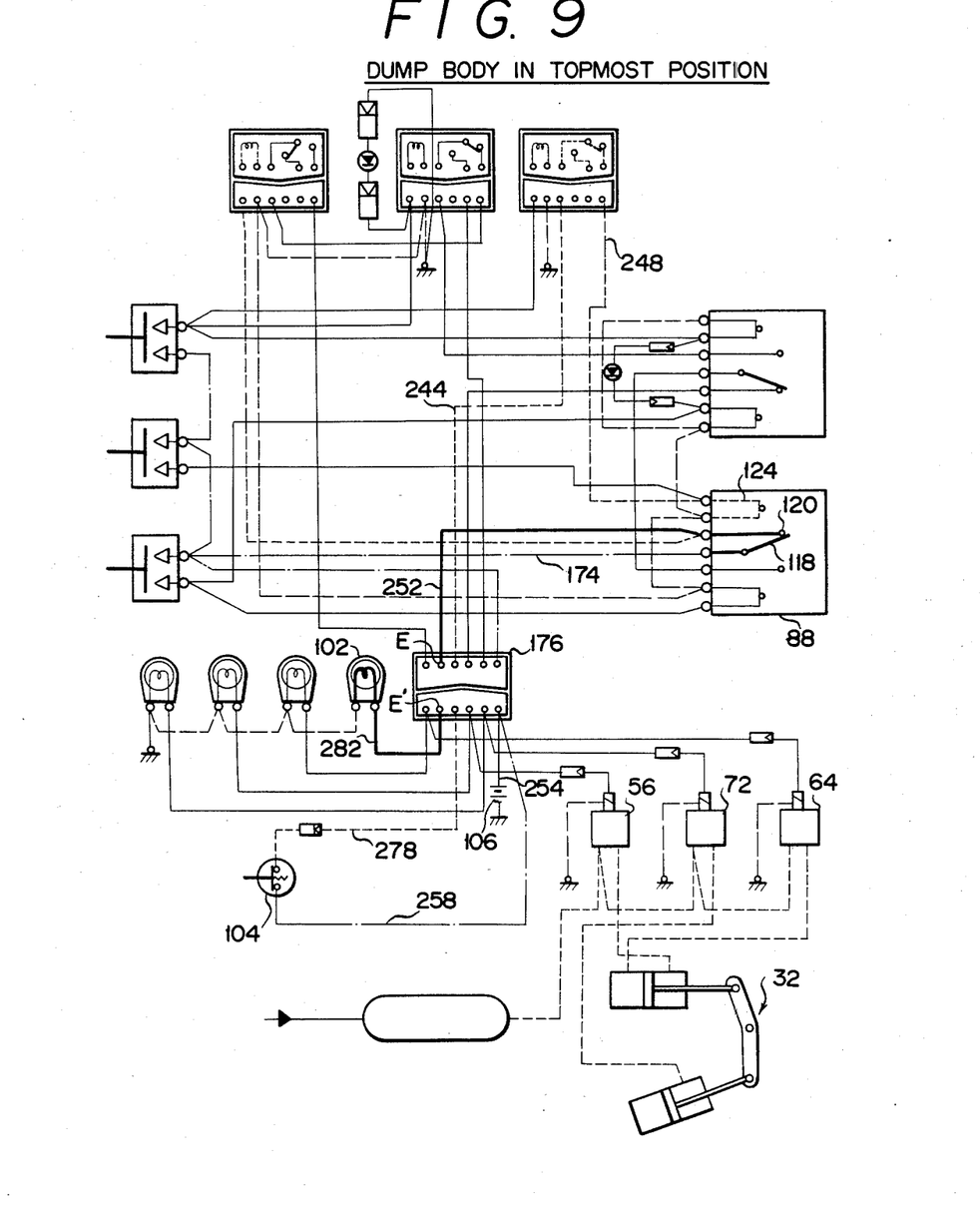
FIG. 9 is also a diagram similar to FIG. 7 but explanatory of the operation of the dump control system when the dump body reaches the topmost position.

With reference to FIG. 9 the body switch 104 becomes automatically closed when the dump body reaches the topmost position. Being connected to the power supply 106 via the dot and dash lines 254 and 258, the closed body switch 104 causes the set circuit 124 of the second relay 88 to be energized via the dotted lines 278, 244 and 248. The movable contact 118 of the second relay moves into engagement with the fixed contact 120 thereby connecting the dot and dash line 174 to the thick line 252 leading to the "hold" pilot lamp 102 via the terminals E and E′ of the connector 176 and the thick line 282. With all the solenoid valves 56, 64 and 72 thus deenergized, the hoist valve actuating mechanism 32 causes the dump body to become locked against motion in its highest position. The "hold" pilot lamp 102 glows to indicate such locking of the dump body in the raised position.

Lowering the Dump Body

Figure 10:
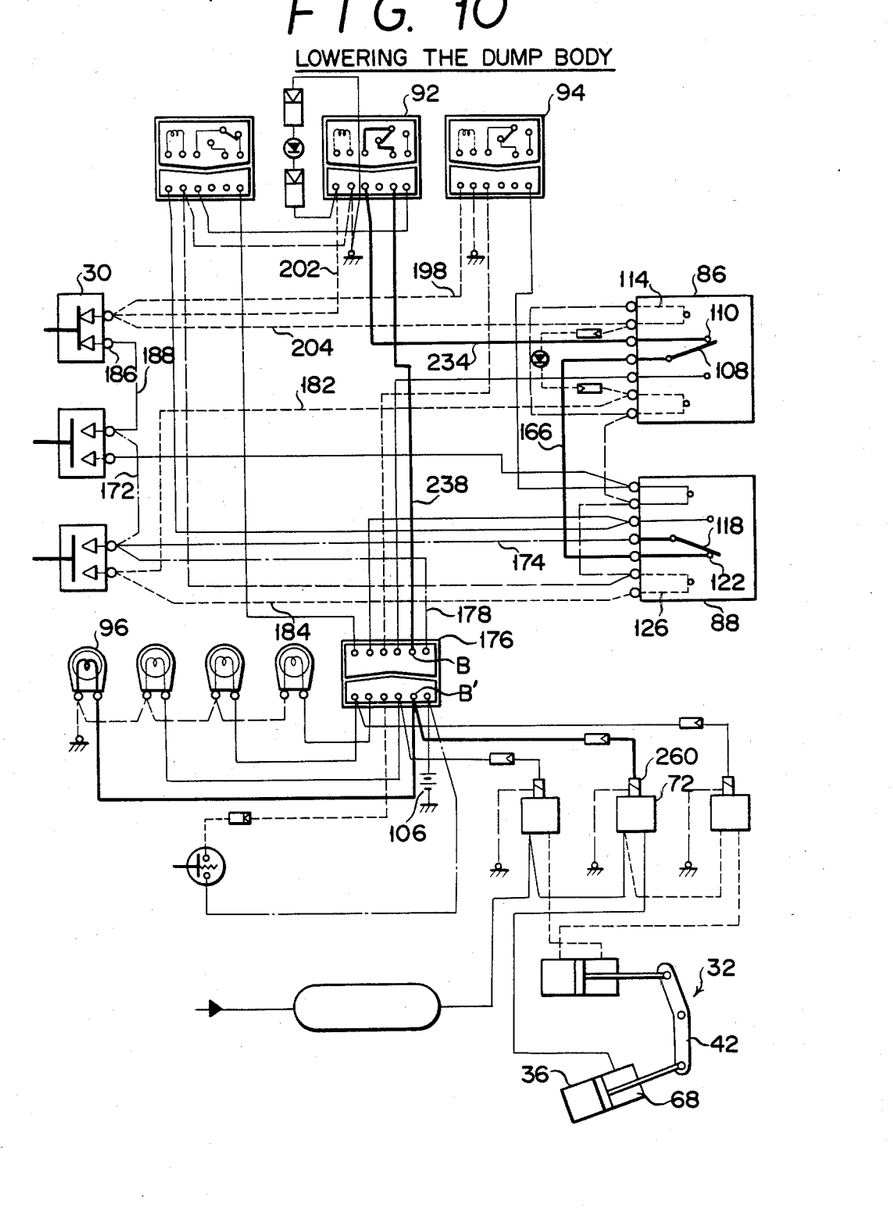
FIG. 10 is also a diagram similar to FIG. 7 but explanatory of the operation of the dump control system when the dump body is being initially lowered by the forced contraction of the hoist cylinders.

The operator may depress the "down/float" switch 30, as in FIG. 10, for lowering the dump body. The power supply 106 is constantly connected to the fixed contact 186 of the "down/float" switch 30 via the dot and dash lines 178, 172 and 188. Consequently the closure of the "down/float" switch 30 results in the energization of the relays 86, 92 and 94 via the dotted lines 204, 202 and 198. The energized set circuit 114 of the first relay 86 causes the movable contact 108 to move into engagement with the fixed contact 110. The reset circuit 126 of the second relay 88 is also energized via the dotted lines 182 and 184, causing the movable contact 118 to engage the fixed contact 122. Thus the power supply 106 becomes connected to the terminal B of the connector 176 via the dot and dash lines 178 and 174 and the thick lines 166, 234 and 238. The associated terminal B' of the connector 176 is connected to the solenoid 260 of the "down" valve 72 and to the "down" pilot lamp 96.

On energization the "down" solenoid valve 72 directs the compressed air into the "down" chamber 68 of the second cylinder 36 of the hoist valve actuating mechanism 32. The lever 42 becomes positioned to initiate the descent of the dump body by the forced contraction of the telescopic hoist cylinders. The "down" pilot lamp 96 glows to indicate the descent of the dump body by the forced contraction of the hoist cylinders.

Figure 11:
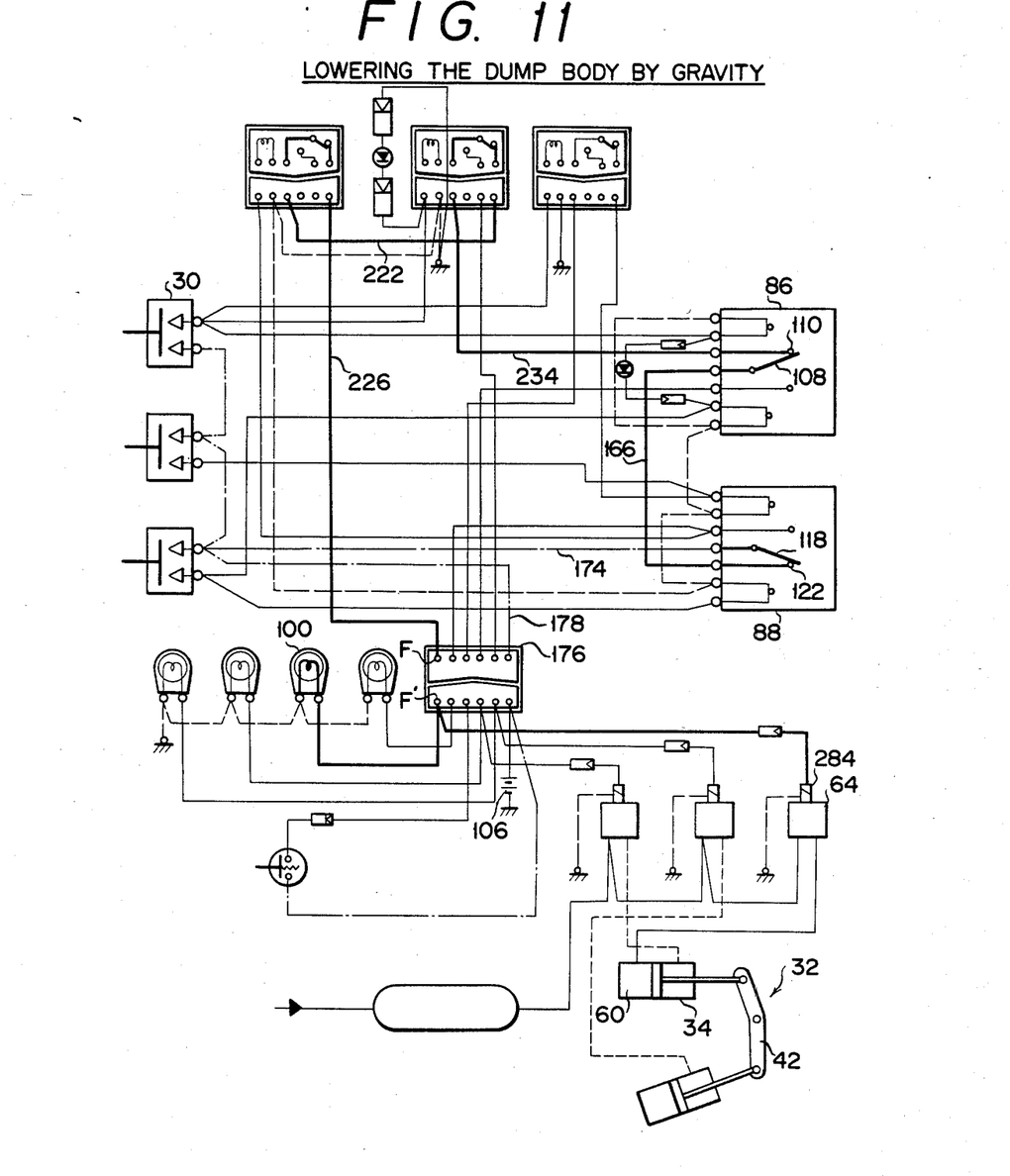
FIG. 11 is also a diagram similar to FIG. 7 but explanatory of the operation of the dump control system when the dump body is being lowered by gravity following the initial lowering by the forced contraction of that hoist cylinders.

As the operator subsequently releases the "down/float" switch 30, all the relays become deenergized as in FIG. 11. The movable contacts 108 and 118 of the first 86 and second 88 relays remain engaged with the fixed contacts 110 and 122 respectively. The result is the connection of the power supply 106 to the terminal F of the connector 176 via the dot and dash lines 178 and 174 and the thick lines 166, 234, 222 and 226. The associated terminal F' of the connector 176 is connected to the solenoid 284 of the "float" valve 64 and to the "float" pilot lamp 100.

The "float" solenoid valve 64 on energization delivers the compressed air into the "float" chamber 60 of the first cylinder 34 of the hoist valve actuating mechanism 32. The lever 42 becomes positioned to allow the dump body to descend under its own weight. The "float" pilot lamp 100 glows to indicate such gravity fall of the dump body. The dump control system is in the state of FIG. 11 even when the dump body is fully lowered.

Holding the Dump Body

Figure 12:
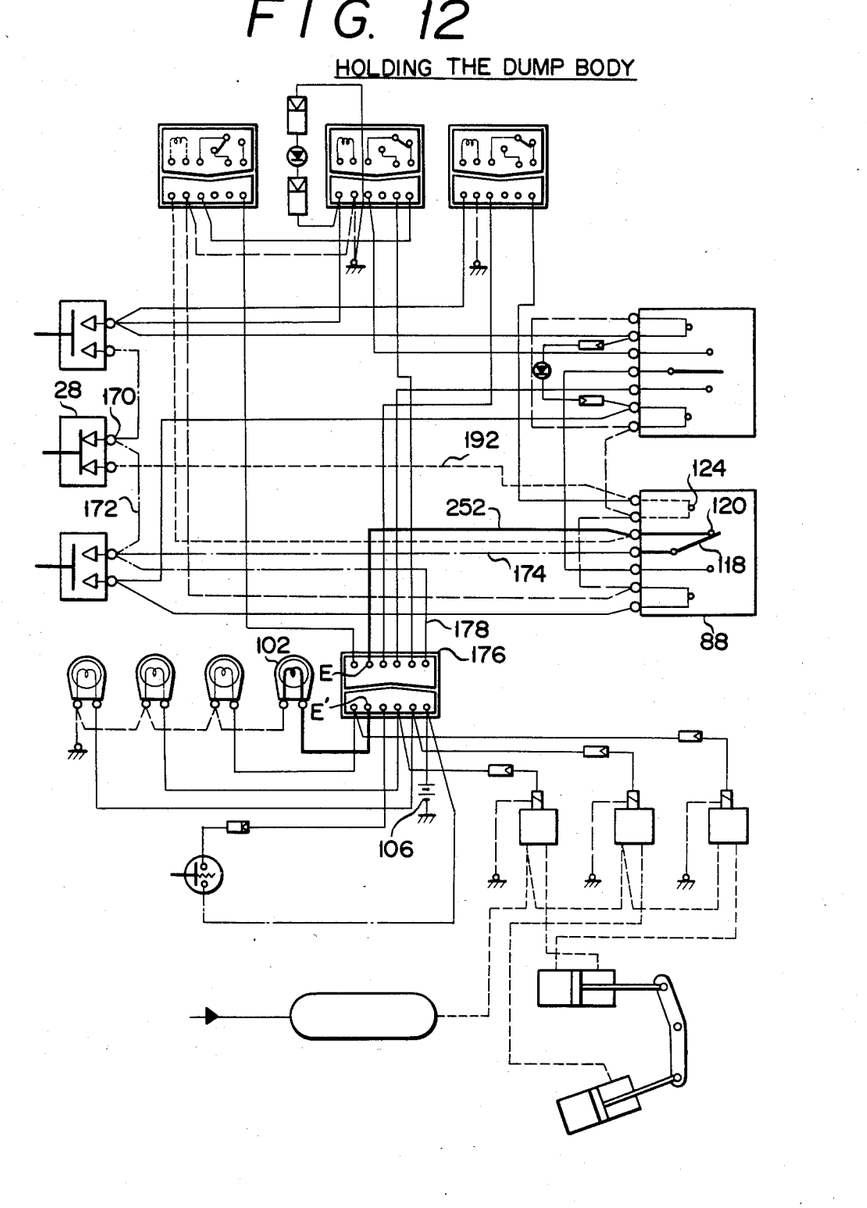
FIG. 12 is also a diagram similar to FIG. 7 but explanatory of the operation of the dump control system when the dump body is being held against motion in any desired position intermediate its raised and lowered positions.

The "hold" switch 28 may be depressed as in FIG. 12 for holding the dump body against motion in any desired angular position. The fixed contact 170 of this switch is in constant connection with the power supply 106 via the dot and dash lines 178 and 172. Upon closure of the "hold" switch 28, therefore, the set circuit 124 of the second relay 88 becomes energized via the dotted line 192, causing the movable contact 118 to engage the fixed contact 120. The second relay 88 connects the dot and dash line 174 to the thick line 252 leading to the terminal E of the connector 176. The associated terminal E' is connected only to the "hold" pilot lamp 102.

As has been set forth in connection with FIG. 9, which represents the condition where the dump body is in the topmost position, the dump body becomes locked against motion upon deenergization of all the solenoid valves. The "hold" pilot lamp 102 glows to indicate such locking of the dump body.

It is understood that the above disclosed embodiment is by way of example only, since a variety of modifications will occur to one skilled in the art to conform to the specific requirements of the intended applications of the invention. Reference is therefore directed to the appended claims for the scope of protection to be afforded to the invention.

What is claimed is:

1. A finger pressure actuable dump control system for a dump vehicle having a dump body, comprising:
   (a) a hoist valve actuating means for operating a hoist valve comprising first and second fluid actuated cylinders operatively connected to the hoist valve, the first cylinder having an "up" chamber and a "float" chamber, the second cylinder have a "down" chamber:
   (b) a source of fluid under pressure;
   (c) "up" valve means for on-off control of communication between the "up" chamber of the first cylinder and the pressurized fluid source;
   (d) "float" valve means for on-off control of communication between the "float" chamber of the first cylinder and the pressurized fluid source;
   (e) "down" valve means for on-off control of communication between the "down" chamber of the second cylinder and the pressurized fluid source;
   (f) an "up" switch to be activated manually;
   (g) a "hold" switch to be activated manually;
   (h) a "down/float" switch to be activated manually;
   (i) "up" circuit means for opening the "up" valve means in response to the activation of the "up" switch;
   (j) "hold" circuit means for closing the "up", "float" and "down" valve means in response to the activation of the "hold" switch;
   (k) "down" circuit means for opening the "down" valve means in response to the activation of the "down/float" switch; and
   (l) "float" circuit means for opening the "float" valve means in response to the release of the "down/float" switch.

2. The dump control system of claim 1 further comprising:
   (a) an "up" pilot lamp connected to be lit up upon activation of the "up" switch;
   (b) a "down" pilot lamp connected to be lit up upon activation of the "down/float" switch;
   (c) a "float" pilot lamp connected to be lit up upon activation of the "hold" switch; and
   (d) a "hold" pilot lamp connected to be lit up upon activation of the "hold" switch.

3. The dump control system of claim 1 wherein the hoist valve actuating means further comprises a lever having piston rods of the first and second fluid actuated cylinders operatively coupled to opposite ends thereof, the lever having a valve actuating portion intermediate the opposite ends thereof operatively connected to the hoist valve.

* * * * *